United States Patent
Aoyagi et al.

(10) Patent No.: US 10,894,917 B2
(45) Date of Patent: Jan. 19, 2021

(54) METHOD OF PRODUCING BETA-SIALON FLUORESCENT MATERIAL

(71) Applicant: NICHIA CORPORATION, Anan (JP)

(72) Inventors: Kenichi Aoyagi, Tokushima (JP); Takashi Kaide, Anan (JP); Motoharu Morikawa, Anan (JP); Shoji Hosokawa, Tokushima (JP)

(73) Assignee: NICHIA CORPORATION, Anan (JP)

( * ) Notice: Subject to any disclaimer, the term of this patent is extended or adjusted under 35 U.S.C. 154(b) by 431 days.

(21) Appl. No.: 15/606,153

(22) Filed: May 26, 2017

(65) Prior Publication Data

US 2017/0342321 A1    Nov. 30, 2017

(30) Foreign Application Priority Data

May 30, 2016 (JP) ................ 2016-107187
May 16, 2017 (JP) ................ 2017-097125

(51) Int. Cl.
C09K 11/77    (2006.01)
C09K 11/08    (2006.01)

(52) U.S. Cl.
CPC ...... C09K 11/7734 (2013.01); C09K 11/0883 (2013.01)

(58) Field of Classification Search
None
See application file for complete search history.

(56) References Cited

U.S. PATENT DOCUMENTS

| 8,709,282 | B2 | 4/2014 | Ichikawa et al. |
| 9,139,769 | B2 | 9/2015 | Emoto et al. |
| 9,828,546 | B2 | 11/2017 | Kechele et al. |
| 2007/0108896 | A1 † | 5/2007 | Hirosaki |
| 2009/0129052 | A1 | 5/2009 | Hirosaki |
| 2009/0153028 | A1 | 6/2009 | Hirosaki |
| 2010/0053932 | A1 † | 3/2010 | Emoto et al. |
| 2012/0211700 | A1 | 8/2012 | Ichikawa et al. |
| 2012/0228551 | A1* | 9/2012 | Emoto ............... C09K 11/0883 252/301.4 R |
| 2016/0122636 | A1 | 5/2016 | Kechele et al. |

(Continued)

FOREIGN PATENT DOCUMENTS

| DE | 102013105307 A1 | 11/2014 |
| JP | 2005-255895 A | 9/2005 |
| JP | 2007-326981 A | 12/2007 |

(Continued)

OTHER PUBLICATIONS

European Patent Office, Extended European Search Report in application No. 17173201.9, dated Nov. 2, 2017, 8 pages.

*Primary Examiner* — Matthew E. Hoban
(74) *Attorney, Agent, or Firm* — Hunton Andrews Kurth LLP

(57) ABSTRACT

Provided is a method of producing a β-sialon fluorescent material having a high light emission intensity and an excellent light emission luminance. The method includes preparing a calcined product having a composition of β-sialon containing an activating element; grinding the calcined product to obtain a ground product; and heat-treating the ground product to obtain a heat-treated product. A specific surface area of the ground product is 0.2 m²/g or more.

20 Claims, 7 Drawing Sheets

(56) References Cited

U.S. PATENT DOCUMENTS

2016/0347999 A1\* 12/2016 Morikawa .......... C09K 11/0883
2016/0355731 A1   12/2016 Aoyagi et al.

FOREIGN PATENT DOCUMENTS

| JP | 2011099040 A | 5/2011 |
|---|---|---|
| JP | 2011-174015 A | 9/2011 |
| JP | 2012056804 A | 3/2012 |
| JP | 2013-173868 † | 9/2013 |
| JP | 2013-173868 A | 9/2013 |
| JP | 2015232150 A | 12/2015 |
| JP | 6020756 B1 | 11/2016 |
| JP | 6024849 B1 | 11/2016 |
| WO | 2011058919 A1 | 5/2011 |

\* cited by examiner
† cited by third party

METHOD OF PRODUCING BETA-SIALON FLUORESCENT MATERIAL

CROSS-REFERENCE TO RELATED APPLICATIONS

This application claims the benefit of Japanese Patent Application No. 2016-107187 filed on May 30, 2016, and Japanese Patent Application No. 2017-97125 filed on May 16, 2017, the disclosures of which are hereby incorporated by reference in their entirety.

BACKGROUND

Technical Field

The present disclosure relates to a method of producing a β-sialon fluorescent material.

Description of Related Art

Light emitting devices including, in combination, a light source and a wavelength conversion member capable of emitting light with a hue different from the hue of the light source when excited by the light from the light source, and thus capable of emitting light of various hues owing to the principle of the mixture of colors of light, have been developed. In particular, light emitting devices composed of a light emitting diode (hereinafter referred to as "LED") combined with a fluorescent material are increasingly and widely utilized, for example, as lighting systems, backlights for liquid crystal display devices, small-sized strobes, and the like, and their spread is being advanced. For example, when a fluorescent material that emits light at short wavelengths, such as blue-green, green, and yellow-green, is combined with a fluorescent material that emits light at long wavelengths, such as orange and red, it is possible to improve color reproduction range of liquid crystal display devices or color rendering properties of lighting systems.

As such fluorescent materials, aluminate fluorescent materials, silicate fluorescent materials, sulfide fluorescent materials, phosphate fluorescent materials, borate fluorescent materials, and so on are known. As a replacement of these fluorescent materials, fluorescent materials that have a nitrogen-containing inorganic crystal as a host crystal in a crystal structure, such as sialon fluorescent materials, oxynitride fluorescent materials, and nitride fluorescent materials, have been proposed as fluorescent materials exhibiting a small decrease in the luminance following a temperature increase and having excellent durability.

Among these fluorescent materials, examples of a sialon fluorescent material that is a solid solution of silicon nitride include an α-type sialon fluorescent material and a β-type sialon fluorescent material, which are different in a crystal structure from each other. The β-type sialon fluorescent material (hereinafter also referred to as "β-sialon fluorescent material") is a highly efficient green fluorescent material, which is excited in a wide wavelength region of from near-ultraviolet light to blue light and has a peak light emission wavelength in the range of 520 nm or longer and 560 nm or shorter.

A β-sialon fluorescent material activated with europium (Eu) contains Eu that is an activating element, and a host crystal thereof is represented by a compositional formula: $Si_{6-z}Al_zO_zN_{8-z}$ ($0<z\leq4.2$). The β-sialon fluorescent material activated with Eu can be produced by mixing compounds serving as raw materials, for example, silicon nitride ($Si_3N_4$), aluminum nitride (AlN), and aluminum oxide ($Al_2O_3$), and europium oxide ($Eu_2O_3$) serving as an activation agent in a predetermined molar ratio and calcining the mixture at around 2,000° C.

Such fluorescent materials are desired to be enhanced in terms of a light emission luminance. In order to enhance the light emission luminance, as a production method of the Eu-activated β-sialon fluorescent material, for example, Japanese Unexamined Patent Publication No. 2005-255895 discloses a method in which a calcined product obtained through calcination of raw materials is further heat-treated in a nitrogen atmosphere at a temperature range of 1,000° C. or more and the calcination temperature or less. In addition, Japanese Unexamined Patent Publication No. 2011-174015 discloses a method in which a calcined product obtained through calcination of raw materials is further heat-treated and then acid-treated. In addition, Japanese Unexamined Patent Publication No. 2007-326981 discloses a method in which raw materials are powdered, the resulting powder is heated two or more times to obtain a β-sialon fluorescent material, or the agglomerated powder is crushed during a period between the two or more heating treatments, to produce a β-sialon fluorescent material. Besides, Japanese Unexamined Patent Publication No. 2013-173868 discloses a method in which raw materials are calcined upon non-addition or addition with an activation agent-containing compound, and in the case where the resulting calcined product is agglomerated, the calcined product is crushed, ground, and/or classified as the need arises, and an activation agent-containing compound in a larger amount than that at the time of the first calcination is added to the calcined product which has been subjected to crushing, grinding and/or classifying, followed by performing second calcination.

SUMMARY

However, there is a need to improve the β-sialon fluorescent materials in terms of the light emission luminance. In accordance with an embodiment of the present disclosure, an object thereof is to provide a method of producing a β-sialon fluorescent material with a high light emission intensity.

Measures for solving the aforementioned problems are as follows. The present disclosure includes the following embodiments.

A first embodiment of the present disclosure concerns a method of producing a β-sialon fluorescent material, including preparing a calcined product having a composition of β-sialon containing an activating element; grinding the calcined product to obtain a ground product; and heat-treating the ground product to obtain a heat-treated product. A specific surface area of the ground product is 0.2 m²/g or more.

A second embodiment of the present disclosure concerns a method of producing a β-sialon fluorescent material, including preparing a calcined product having a composition of β-sialon containing an activating element; grinding the calcined product to obtain a ground product; and heat-treating the ground product to obtain a heat-treated product. The grinding and heat-treating steps are repeated two times or more in this order. In at least one grinding step, an average particle diameter of the ground product is 40 μm or less.

In accordance with the embodiments of the present disclosure, a production method from which a β-sialon fluorescent material with a high light emission intensity is obtained can be provided.

DETAILED DESCRIPTION

Figure 1:
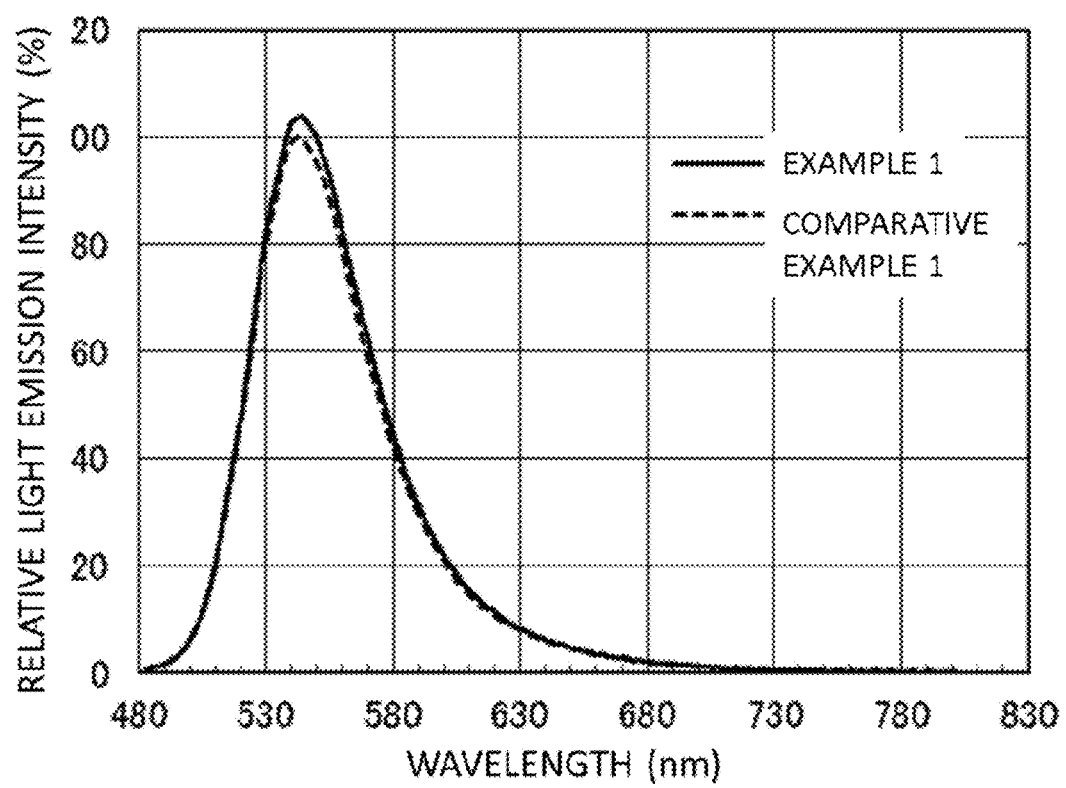
FIG. 1 is a diagram showing light emission spectra of β-sialon fluorescent materials according to an example of the present disclosure and a comparative example.

A method of producing a fluorescent material according to the present disclosure is hereunder described below. However, the embodiments shown below exemplify the method of producing a β-sialon fluorescent material for practicing the technical concept of the present invention, and the scope of the present invention is not limited to the method of producing a β-sialon fluorescent material shown below. In this specification, the relationship between the color name and the chromaticity coordinate, the relationship between the wavelength range of light and the color name of monochromic light, and the like are in accordance with JIS Z8110.

In this specification, the average particle diameter is a particle diameter (Dm; median diameter) at which the volume cumulative frequency as measured with a laser diffraction particle size distribution measuring apparatus (for example, MASTER SIZER 3000, manufactured by Malvern Instruments, Ltd.) reaches 50% from the small diameter side. In addition, in this specification, the particle diameter D10 is a particle diameter at which the volume cumulative frequency as measured with the aforementioned apparatus reaches 10% from the small diameter side. In addition, in this specification, the particle diameter D90 is a particle diameter at which the volume cumulative frequency as measured with the aforementioned apparatus reaches 90% from the small diameter side.

Method of Producing β-Sialon Fluorescent Material

A method of producing a β-sialon fluorescent material according to the first embodiment of the present disclosure includes preparing a calcined product having a composition of β-sialon containing an activating element; grinding the calcined product to obtain a ground product; and heat-treating the ground product to obtain a heat-treated product. A specific surface area of the ground product is 0.2 m$^2$/g or more.

A method of producing a β-sialon fluorescent material according to the second embodiment of the present disclosure includes preparing a calcined product having a composition of β-sialon containing an activating element; grinding the calcined product to obtain a ground product; and a heat-treating the ground product to obtain a heat-treated product. The grinding and heat-treating steps are repeated two times or more in this order. In at least one grinding step, an average particle diameter of the ground product is 40 μm or less.

Calcination Step

The method according to each of the first embodiment and the second embodiment of the present disclosure includes preparing a calcined product having a composition of β-sialon containing an activating element (the step is sometimes referred to as "calcination step" herein).

The calcined product can be obtained through calcination of a raw material mixture. Examples of the raw material that constitutes the raw material mixture include a compound containing an activating element and a compound containing elements that constitute a composition of β-sialon.

Compound Containing Elements that Constitute Composition of β-Sialon

Examples of the compound containing elements that constitute the composition of β-sialon include an aluminum compound, silicon nitride, compound containing activated element, and the like.

Aluminum Compound

Examples of the aluminum compound include an oxide, a hydroxide, a nitride, an oxynitride, a fluoride, a chloride, and the like, each containing aluminum. As the aluminum compound, an aluminum metal elemental substance or an aluminum alloy may be used, and an aluminum metal elemental substance or an aluminum alloy may also be used in place of at least a part of the aluminum compound.

Specifically, examples of the aluminum compound may include aluminum nitride (AlN), aluminum oxide (Al$_2$O$_3$), aluminum hydroxide (Al(OH)$_3$), and the like. The aluminum compound may be used alone, or may be used in combination of two or more thereof. For example, when two kinds of aluminum compounds such as aluminum nitride and aluminum oxide are used in combination, the molar ratio of aluminum nitride to aluminum oxide (AlN:Al$_2$O$_3$) is preferably in a range of 99:1 to 1:99, more preferably in a range of 97.5:2.5 to 75:25, and two kinds of aluminum compounds are mixed used.

Any average particle diameter of a usually used aluminum compound may be adopted. The average particle diameter of the aluminum compound is preferably in a range of 0.01 μm or more and 20 μm or less, and more preferably in a range of 0.1 μm or more and 10 μm or less.

The purity in the aluminum compound is preferably 95.0% by mass or more, more preferably 99.0% by mass or more, and still more preferably 99.5% by mass or more from the viewpoint of decreasing impurities other than aluminum.

Silicon Nitride

The silicon nitride is a silicon compound containing a nitrogen atom and a silicon atom. A raw material of the silicon nitride may contain silicon oxide or may contain silicon oxynitride.

In the case where an oxygen atom is contained in the silicon nitride, the content of the oxygen atom is preferably 1.5% by mass or less, and preferably 0.3% by mass or more, and more preferably 0.4% by mass or more relative to the silicon nitride containing an oxygen atom (100% by mass).

As for the purity of the silicon nitride, from the viewpoint of decreasing impurities, it is preferred that the content of impurities other than oxygen be less than 1% by mass.

An average particle diameter of the silicon nitride is preferably in a range of 0.01 μm or more and 15.00 μm or less, more preferably in a range of 0.05 μm or more and 10.00 μm or less, and still more preferably in a range of 0.10 μm or more and 5.00 μm or less.

The raw material mixture may further contain, in addition to the silicon nitride that is one compound containing elements that constitute the composition of β-sialon, a silicon compound, such as a silicon elemental substance and silicon oxide. Examples of the silicon compound include silicon oxide, silicon oxynitride, and a silicate. An average particle diameter of the silicon elemental substance or silicon compound is preferably in a range of 0.01 μm or more and 15.00 μm or less, more preferably in a range of 0.05 μm or more and 10.00 μm or less, and still more preferably in a range of 0.10 μm or more and 5.00 μm or less.

Compound Containing Activating Element

The compound containing an activating element is contained in the raw material mixture. The compound containing an activating element may be heat-treated together with the ground product, or may be annealed together with the heat-treated product. In this specification, the compound, which is contained in the raw material mixture is also referred to as a first compound containing an activating element; the compound, which is heat-treated together with the ground product, is also referred to as a second compound containing an activating element; and the compound, which is annealed together with the heat-treated product, is also referred to as a third compound containing an activating element.

The first compound containing an activating element, the second compound containing an activating element, and the third compound containing an activating element may be compounds, which are the same as or different from each other.

The activating element is at least one element selected from the group consisting of Eu, Ce, Tb, Yb, Sm, Dy, Er, Mn, and Ag, preferably at least one element selected from the group consisting of Eu, Ce, Tb, Yb, Sm, and Dy, and more preferably at least one element selected from the group consisting of Eu, Ce, Tb, and Yb.

Examples of the compound containing an activating element include an oxide, a hydroxide, a nitride, an oxynitride, a fluoride, and a chloride, each containing an activating element. In addition, a metal elemental substance composed of an activating element or an alloy containing an activating element in place of at least a part of the compound containing an activating element may be used.

In the case where the compound containing an activating element is, for example, europium (Eu), specifically, examples of the compound containing europium include europium oxide ($Eu_2O_3$), europium nitride (EuN), and europium fluoride ($EuF_3$). Specifically, examples of other compound containing an activating element include $CeO_2$, $CeF_3$, CeN, $CeCl_3$, $Tb_2O_3$, $TbF_3$, $TbCl_3$, $Yb_2O_3$, $YbF_3$, $YbCl_3$, $Sm_2O_3$, $SmF_3$, SmN, $SmCl_3$, $Dy_2O_3$, $DyF_3$, $DyCl_3$, $Er_2O_3$, $ErCl_3$, $MnO_2$, $MnCl_2$, $Ag_2O$, and AgCl. The compound containing an activating element may also be a hydrate. In addition, the compound containing an activating element may be used alone, or may be used in combination of two or more thereof.

An average particle diameter of the compound containing an activating element is preferably in a range of 0.01 μm or more and 20.00 μm or less, and more preferably 0.10 μm or more and 10.00 μm or less.

The purity of the compound containing an activating element is typically 95.0% by mass or more, and preferably 99.5% by mass or more from the viewpoint of decreasing impurities.

The compound containing an activating element may be contained in the raw material mixture in a ratio so as to satisfy the composition of β-sialon containing an activating element to be obtained. Alternatively, after obtaining the calcined product having the composition of β-sialon containing an activating element, taking into consideration the amount of the compound containing an activating element to be added in the heat treatment of the ground product or the annealing treatment of the heat-treated product, the compound containing an activating element may be contained in the raw material mixture in a ratio smaller than that in the composition of β-sialon containing an activating element to be obtained.

It is preferred that the amount of the first compound containing an activating element, which is contained in the raw material mixture, be larger than the amount of the second compound containing an activating element. This is because, on the occasion of calcining the raw material mixture to obtain a calcined product, the activating element in a largest amount is incorporated into the crystal of the calcined product.

In the case where a molar ratio of the activating element, which is contained in the resulting β-sialon fluorescent material is defined as 1, the amount of the first compound containing an activating element which is contained in the raw material mixture is an amount of preferably more than 0.50 in terms of a molar ratio. The molar ratio is an amount of more preferably 0.55 or more, still more preferably 0.60 or more, and especially preferably 0.65 or more.

A mixing ratio of the aluminum compound, the silicon nitride, and the compound containing an activating element in the raw material mixture may be properly adjusted according to the desired composition of β-sialon containing an activating element. In the case where the molar amount of the aluminum element, which is contained in the raw material mixture is represented by z, a molar ratio of the silicon element to the aluminum element ((molar amount of Si):(molar amount of Al)) is represented by (6−z):z (0<z≤4.2), and preferably (0.01≤z<1.0). A molar ratio of a total molar amount of the silicon element and the aluminum element to the activating element ((total molar amount of Si and Al):(molar amount of the activating element)) is, for example, preferably 6:0.001 to 6:0.05, and more preferably 6:0.003 to 6:0.025.

The β-sialon fluorescent material preferably has a composition represented by the following formula (Ip). In the formula (Ip), z is a number satisfying an expression: 0<z≤4.2.

$$Si_{6-z}Al_zO_zN_{8-z}:Eu \qquad (Ip)$$

The raw material mixture may contain a β-sialon fluorescent material that is separately prepared, as the need arises. In the case where the β-sialon fluorescent material is contained in the raw material mixture, its content is preferably in a range of 1% by mass or more and 50% by mass or less, more preferably in a range of 2% by mass or more and 40% by mass or less, and still more preferably in a range of 3% by mass or more and 30% by mass or less in the total amount (100% by mass) of the raw material mixture.

The raw material mixture may contain a flux, such as a halide, as the need arises. When the flux is contained in the raw material mixture, the reaction among the raw materials is promoted, and a solid phase reaction is readily advanced more uniformly. As for this matter, it may be considered that the temperature of the heat treatment in preparing a calcined product is substantially the same as or higher than the formation temperature of a liquid phase of a halide to be used as the flux, so that the reaction is promoted.

Examples of the halide include fluorides or chlorides of a rare earth metal, an alkaline earth metal, or an alkali metal. In the case where a halide of a rare earth metal is used as the flux, the flux can also be added as the compound such that the calcined product has a desired composition. For example, in the case where europium is contained in the desired composition, europium fluoride that is the halide containing europium can be added as the flux.

In the case where the raw material mixture contains the flux, the content of the flux is preferably 20% by mass or less, and more preferably 10% by mass or less, and preferably 0.1% by mass or more in the raw material mixture (100% by mass).

As for the raw material mixture, after weighing the respective raw materials in a desired blending ratio, for example, the raw materials may be ground and mixed using a dry grinder, such as a ball mill, a vibration mill, a hammer mill, a roll mill, and a jet mill; may be ground and mixed using a mortar and a pestle; may be mixed using a mixing machine, for example, a ribbon blender, a Henschel mixer, a V type blender, etc.; or may be ground and mixed using both a dry grinder and a mixing machine. In addition, the mixing may be achieved by means of either dry mixing or wet mixing upon addition of a solvent or the like.

The raw material mixture may be charged in, for example, a boron nitride-made crucible and then calcined.

The calcination temperature for calcining the raw material mixture to obtain a calcined product is preferably in a range of 1,850° C. or higher and 2,100° C. or lower, more preferably in a range of 1,900° C. or higher and 2,050° C. or lower, still more preferably in a range of 1,920° C. or higher and 2,050° C. or lower, and especially preferably in a range of 2,000° C. or higher and 2,050° C. or lower.

When the raw material mixture is calcined at the predetermined temperature or higher, the calcined product having a composition of β-sialon containing an activating element is efficiently formed, and the activating element is readily incorporated into the crystal of the calcined product having a composition of β-sialon. In addition, when the raw material mixture is calcined at the predetermined temperature or lower, the decomposition of the calcined product having a composition of β-sialon is suppressed.

The atmosphere where the raw material mixture is calcined is preferably an atmosphere containing a nitrogen gas, and the content of the nitrogen gas in the atmosphere is preferably 90% by volume or more, and more preferably 95% by volume or more. In the case where the atmosphere where the raw material mixture is calcined is an atmosphere containing a nitrogen gas, other gas, such as hydrogen, oxygen, and ammonia, may be contained in addition to the nitrogen gas.

The pressure at which the raw material mixture is calcined is not particularly limited so long as the desired calcined product is obtained. It is preferred that the pressure at which the raw material mixture is calcined be a relatively high pressure from the viewpoint of suppressing the decomposition of the resulting calcined product. The pressure at which the raw material mixture is calcined is preferably in a range of atmospheric pressure (about 0.1 MPa) or more and 200 MPa or less, more preferably in a range of 0.3 MPa or more and 100 MPa or less, and still more preferably in a range of 0.5 MPa or more and 50 MPa or less. The pressure is especially preferably in a range of 0.6 MPa or more and 1.2 MPa or less from the viewpoint of restriction on industrial equipment.

In the calcination step, before the temperature of the resulting calcined product is lowered to room temperature, a first holding step of holding the calcined product at a predetermined temperature that is higher than room temperature and lower than the calcination temperature may be provided. The temperature of the first holding step is preferably in a range of 1,000° C. or higher and lower than 1,800° C., and more preferably in a range of 1,200° C. or higher and 1,700° C. or lower. The time of the first holding step is preferably in a range of 0.1 hours or more and 20 hours or less, and more preferably in a range of 1 hour or more and 10 hours or less. When the first holding step of holding the calcined product is provided, the reaction of the raw material mixture is advanced, and the activating element is readily incorporated into the crystal of the calcined product.

The temperature lowering time for lowering the temperature of the resulting calcined product to room temperature is preferably in a range of 0.1 hours or more and 20 hours or less, more preferably in a range of 1 hour or more and 15 hours or less, and still more preferably in a range of 3 hours or more and 12 hours or less. When the temperature lowering time is set to a fixed level or more, the activating element is readily incorporated into the crystal of the calcined product during the temperature lowering.

Grinding Step

The method of producing a β-sialon fluorescent material according to each of the first embodiment and the second embodiment of the present disclosure includes grinding the calcined product to obtain a ground product (sometimes referred to as "grinding step" herein).

In the first embodiment and the second embodiment of the present disclosure, grinding the calcined product to obtain a ground product means not only coarse grinding or crushing of a powdered agglomerate resulting from agglomeration of powders of the calcined product but also strong grinding until the calcined product becomes a ground product having a predetermined size.

In the grinding step according to the first embodiment of the present disclosure, a specific surface area of the resulting ground product is 0.20 $m^2/g$ or more. The specific surface area of the resulting ground product is preferably 0.25 $m^2/g$ or more, more preferably 0.28 $m^2/g$ or more, and still more preferably 0.29 $m^2/g$ or more.

When the specific surface area of the ground product is less than 0.20 $m^2/g$, the ground product becomes excessively large; even when heat-treated in a heat treatment step as mentioned later, a rearrangement reaction of crystal is hardly caused; the activating element is hardly incorporated into the crystal; and it becomes difficult to enhance the light emission intensity.

In the method of producing a β-sialon fluorescent material according to the second embodiment of the present disclosure, a specific surface area of the ground product having been subjected to strong grinding is preferably 0.20 $m^2/g$ or more, more preferably 0.25 $m^2/g$ or more, still more preferably 0.28 $m^2/g$ or more, and especially preferably 0.29 $m^2/g$ or more. When the calcined product is ground such that the specific surface area is 0.20 $m^2/g$ or more, and after grinding, the ground product is again subjected to a heat treatment as mentioned later, the crystal is rearranged, and on the occasion when the crystal is rearranged, the activating element is readily incorporated into the crystal, and a β-sialon fluorescent material having a high relative light emission intensity and an excellent light emission luminance can be obtained.

In the method of producing a β-sialon fluorescent material according to the second embodiment of the present disclosure, with respect to the grinding step to be performed two or more times, it is preferred that in the at least one grinding step, the strong grinding be performed such that the specific surface area of the ground product is 0.35 $m^2/g$ or more, and it is more preferred that in at least one grinding step, the strong grinding be performed such that the specific surface area of the ground product is 0.37 $m^2/g$ or more.

Though an upper limit value of the specific surface area of the ground product obtained in the grinding step is not particularly limited, when the specific surface area is made excessively large, it takes time and energy for achieving the grinding, and the production becomes complicated. Therefore, the specific surface area of the ground product is preferably 1.00 m²/g or less, more preferably 0.95 m²/g or less, and still more preferably 0.90 m²/g or less.

It is preferred that the calcined product be ground using a dry grinder, such as a ball mill, a vibration mill, a hammer mill, a roll mill, and a jet mill.

As for the calcined product, there is a case where the powders of the calcined product form a powdered agglomerate. In the grinding step, it is preferred that the calcined product, which has become the resulting powdered agglomerate, be crushed or coarsely ground using a mortar and a pestle, or the like to such an extent that the average particle diameter is several tens µm, specifically the average particle diameter is more than 20 µm and less than 100 µm, and the resultant is then ground using the aforementioned dry grinder or the like so as to have a predetermined specific area.

The grinding step may include a step of performing classification by passing through the ground product obtained by means of dry sieving or the like.

An average particle diameter (Dm) of the ground product is preferably in a range of 5 µm or more and 40 µm or less, more preferably in a range of 8 µm or more and 30 µm or less, and still more preferably in a range of 10 µm or more and 20 µm or less. When the average particle diameter (Dm) of the ground product falls within the aforementioned range, it may be considered that in the heat-treated product obtained by a heat treatment step as mentioned later, when the small particle comes into contact with the large particle, the small particle is easy to grow to an extent that the size of the particle becomes a desired size, as compared with the case where the large particles come into contact with each other. In addition, it may be considered that the rearrangement of crystal is readily caused on the contact surface between the small particle and the large particle at the time of heat treatment, and on the occasion when the crystal is rearranged, the activating element is readily incorporated into the crystal. As a result, it may be considered that the light emission intensity can be enhanced.

In the method of producing a β-sialon fluorescent material according to the second embodiment of the present disclosure, the grinding and heat treatment steps are repeated two times or more in this order, and in at least one grinding step, an average particle diameter of the ground product is 40 µm or less. The average particle diameter (Dm) of the ground product in at least one grinding step being more than 40 µm is not preferred because the contact between the small particle and the large particle is hardly caused; the particle hardly grows; the rearrangement of crystal is hardly caused on the contact surface between the small particle and the large particle at the time of heat treatment; and the activating element is hardly incorporated into the crystal.

The particle diameter D10 of the ground product, at which the volume cumulative frequency reaches 10% from the small diameter side in the particle size distribution, is preferably in a range of 1 µm or more and 12 µm or less, more preferably in a range of 2 µm or more and 11 µm or less, and still more preferably in a range of 3 µm or more and 10.5 µm or less. When the D10 of the ground product falls within the aforementioned range, the ground product is strongly ground, and the ground product having a fine particle diameter is contained. Therefore, by performing a heat treatment as mentioned later, on the occasion when the ground products react with each other, and the crystal is rearranged, the activating element is readily incorporated into the crystal, and the light emission intensity can be enhanced.

The particle diameter D90 of the ground product, at which the volume cumulative frequency reaches 90% from the small diameter side in the particle size distribution, is preferably in a range of 15 µm or more and 50 µm or less, more preferably in a range of 18 µm or more and 45 µm or less, and still more preferably in a range of 20 µm or more and 40 µm or less. When the D90 of the ground product falls within the aforementioned range, the relatively large particle is contained in the ground product together with the small particle, and the reaction between the small particle and the large particle is more advanced by a heat treatment as mentioned later to cause the rearrangement of crystal; and not only the activating element is readily incorporated into the rearranged crystal, but also the heat-treated product can be grown to a desired size, and the light emission intensity can be enhanced.

Heat Treatment Step

The method of producing a β-sialon fluorescent material according to each of the first embodiment and the second embodiment of the present disclosure includes heat-treating the ground product to obtain a heat-treated product (sometimes referred to as "heat treatment step" herein).

In the method of producing a β-sialon fluorescent material according an embodiment of the present disclosure, due to the heat treatment step of again heat-treating the ground product, which has been ground so as to have a predetermined surface area, on the occasion when the crystal is rearranged, the activating element is readily incorporated into the crystal, and the light emission intensity can be enhanced.

A heat treatment temperature in the heat treatment step is preferably in a range of 1,850° C. or higher and 2,100° C. or lower, more preferably in a range of 1,900° C. or higher and 2,080° C. or lower, still more preferably in a range of 1,920° C. or higher and 2,050° C. or lower, and especially preferably in a range of 1,970° C. or higher and 2,040° C. or lower. It is preferred that the heat treatment temperature in the heat treatment step be the same as the heat treatment temperature in the calcination step, or a temperature lower than the heat treatment temperature in the calcination step. In the case where there is a temperature difference between the heat treatment temperature in the calcination step and the heat treatment temperature in the heat treatment step, the temperature difference is preferably 10° C. or more, and more preferably 20° C. or more, and an upper limit of the temperature difference is preferably 100° C. or less.

The atmosphere where the ground product is heat-treated is preferably an inert gas atmosphere. The inert gas atmosphere as referred to in this specification means an atmosphere containing, as a main component, argon, helium, nitrogen, or the like. Though there is a case where the inert gas atmosphere contains oxygen as an inevitable impurity, so long as the concentration of oxygen contained in an atmosphere is 15% by volume or less, such an atmosphere is included as the inert gas atmosphere. The concentration of oxygen in the inert gas atmosphere is preferably 10% by volume or less, more preferably 5% by volume or less, and still more preferably 1% by volume or less. When the oxygen concentration is the predetermined value or more, there is a concern that the heat-treated product is excessively oxidized.

It is preferred that the inert gas atmosphere where the ground product is heat-treated be an atmosphere containing a nitrogen gas. The content of the nitrogen gas in the inert gas atmosphere is preferably 90% by volume or more, and more preferably 95% by volume or more. In the case where the atmosphere where the raw material mixture is calcined is an atmosphere containing a nitrogen gas, it may contain, in addition to the nitrogen gas, other gas than the nitrogen gas, such as hydrogen and ammonia. Hydrogen or hydrogen, which is produced through decomposition of ammonia, has a reducing action and is easy to reduce the activating element, for example, to reduce the valence of Eu from trivalent to divalent as a center of light emission, and the light emission intensity can be enhanced.

It is preferred that the pressure at which the ground product is heat-treated be a relatively high pressure from the viewpoint of suppressing the decomposition of the resulting heat-treated product. The pressure at which the ground product is heat-treated is preferably in a range of atmospheric pressure (about 0.1 MPa) or more and 200 MPa or less, more preferably in a range of 0.3 MPa or more and 100 MPa or less, and still more preferably in a range of 0.5 MPa or more and 50 MPa or less. The pressure is especially preferably in a range of 0.6 MPa or more and 1.2 MPa or less from the viewpoint of restriction on industrial equipment.

As for the heat treatment of the ground product, it is preferred that, after elevating the temperature to a predetermined heat treatment temperature, the heat treatment be performed at the predetermined heat treatment temperature for a fixed time. The heat treatment time is preferably in a range of 1 hour or more and 48 hours or less, more preferably in a range of 2 hours or more and 24 hours or less, and still more preferably in a range of 3 hours or more and 20 hours or less. When the heat treatment time is the predetermined value or more, on the occasion when the elements in the ground product are again rearranged into a crystal structure due to the heat treatment, the activating element is readily incorporated into the crystal to be rearranged. When the heat treatment time is the predetermined value or less, the decomposition of the crystal structure of the heat-treated product can be suppressed.

In the heat treatment step, before the temperature of the resulting heat-treated product is lowered to room temperature, a second holding step of holding the heat-treated product at a predetermined temperature that is higher than room temperature and lower than the heat treatment temperature may be provided. The temperature of the second holding step is preferably in a range of 1,000° C. or higher and lower than 1,800° C., and more preferably in a range of 1,200° C. or higher and 1,700° C. or lower. The time of the second holding step is preferably in a range of 0.1 hours or more and 20 hours or less, and more preferably in a range of 1 hour or more and 10 hours or less. When the second holding step of holding the heat-treated product is provided, the reaction of the heat-treated product is advanced, and the activating element is readily incorporated into the crystal resulting from rearrangement of the heat-treated product.

The temperature lowering time for lowering the temperature of the resulting heat-treated product to room temperature is preferably in a range of 0.1 hours or more and 20 hours or less, more preferably in a range of 1 hour or more and 15 hours or less, and still more preferably in a range of 3 hours or more and 12 hours or less. When the temperature lowering time is the predetermined value or more, the activating element is readily incorporated into the crystal resulting from rearrangement of the heat-treated product during the temperature lowering. Even when the temperature lowering time is made excessively long, the incorporation of the activating element to an extent of more than a certain degree cannot be expected. Therefore, when the temperature lowering time is set to the predetermined value or less, the wasteful production time consumption can be eliminated, and the activating element can be incorporated into the crystal resulting from rearrangement of the heat-treated product.

In the heat treatment step, it is preferred to heat-treat the ground product together with the second compound containing an activating element.

So long as the β-sialon fluorescent product having the desired composition is obtained, the second compound containing an activating element may be a compound the same as or different from the first compound containing an activating element which is contained in the raw material mixture.

It is preferred that the amount of the second compound containing an activating element be smaller than the amount of the first compound containing an activating element which is contained in the raw material mixture. This is because that it may be considered that, as compared with the second activating element that performs the heat treatment in the heat treatment step together with the ground product, the activating element (first activating element) which is contained in the raw material mixture can be contained more efficiently in the crystal structure of the β-sialon fluorescent material.

In the case where a molar ratio of the activating element which is contained in the resulting β-sialon fluorescent material is defined as 1, the amount of the second compound containing an activating element which is heat-treated together with the ground product is an amount of preferably less than 0.50 in terms of a molar ratio. The molar ratio is an amount of more preferably 0.45 or less, still more preferably 0.40 or less, and especially preferably 0.35 or less.

In the method of producing a β-sialon fluorescent material according to the second embodiment of the present disclosure, the grinding and heat treatment steps are repeated two times or more in this order.

In the method of producing a β-sialon fluorescent material according to the second embodiment of the present disclosure, by repeating the grinding and heat treatment steps in this order, the crystal in the heat-treated product is rearranged, and on the occasion when the crystal is rearranged, the activating element is readily incorporated into the crystal, and the light emission intensity can be enhanced.

Annealing Treatment Step

It is preferred that the method of producing a β-sialon fluorescent material according to each of the first embodiment and the second embodiment of the present disclosure include an annealing treatment step of annealing the heat-treated product in a noble gas atmosphere at a temperature that is lower than the heat treatment temperature in the heat treatment step, to obtain an annealed product.

In the method of producing a β-sialon fluorescent material according to an embodiment of the present disclosure, at least a part of an unstable crystal portion existing in the heat-treated product, such as a non-crystalline portion, can be decomposed by the annealing treatment step of annealing the heat-treated product, and a content proportion of the stable crystal structure into which the activating element has been incorporated can be increased, thereby enhancing the light emission intensity.

As for the noble gas atmosphere in the annealing treatment step, at least one noble gas, such as helium, neon, and argon, has only to be contained in the atmosphere, and it is preferred that at least argon be contained in the atmosphere. The noble gas atmosphere may contain, in addition to the noble gas, oxygen, hydrogen, nitrogen. The content of the noble gas in the noble gas atmosphere is preferably 95% by volume or more, and more preferably 99% by volume or more.

In the case of performing the annealing treatment in the noble gas atmosphere, the pressure is preferably in a range of atmospheric pressure (about 0.1 MPa) or more and 1 MPa or less, more preferably in a range of atmospheric pressure or more and 0.5 MPa or less, and still more preferably in a range of atmospheric pressure or more and 0.2 MPa or less.

The annealing treatment of the heat-treated product may be performed under reduced pressure that is lower than the atmospheric pressure, and may also be performed in vacuum. In the case of performing the annealing treatment in vacuum, the pressure is, for example, 10 kPa or less, preferably 1 kPa or less, and more preferably 100 Pa or less. Here, the terms "under reduced pressure" or "in vacuum" do not exclude the presence of a gas at the time of annealing treatment, and a gas, such as a noble gas, nitrogen, hydrogen, and oxygen may exist even in the annealing treatment under reduced pressure or in vacuum.

The annealing treatment temperature is preferably in a range of 1,300° C. or higher and 1,600° C. or lower, and more preferably in a range of 1,350° C. or higher and 1,500° C. or lower. It is preferred that the annealing treatment temperature in the annealing treatment step be lower than the calcination temperature. In addition, it is preferred that the annealing treatment temperature be lower than the heat treatment temperature. In the annealing treatment step, by setting the temperature to the predetermined temperature range, an unstable phase which is contained in the heat-treated product, for example, a non-crystalline portion, a low crystalline portion with high dislocation density and defect density, can be efficiently thermally decomposed, and a high crystalline β-sialon fluorescent material having a large content proportion of the stable crystal structure can be obtained.

In the annealing treatment step, it is preferred that, after elevating the temperature to the predetermined annealing treatment temperature, this temperature be held for a fixed time.

The annealing treatment time is preferably in a range of 1 hour or more and 48 hours or less, more preferably in a range of 2 hours or more and 24 hours or less, and still more preferably in a range of 3 hours or more and 20 hours or less. When the annealing treatment temperature is the predetermined value or more, an unstable phase which is contained in the heat-treated product, for example, a non-crystalline portion, a low crystalline portion, is readily decomposed, and when the annealing treatment temperature is the predetermined value or less, the decomposition of the crystal structure can be suppressed.

In the annealing treatment step, before the temperature of the resulting heat-treated product is lowered to room temperature, a third holding step of holding the heat-treated product at a predetermined temperature that is higher than room temperature and lower than the annealing treatment temperature may be provided. The temperature of the third holding step is preferably in a range of 800° C. or higher and lower than 1,600° C., and more preferably in a range of 1,000° C. or higher and 1,400° C. or lower. The time of the third holding step is preferably in a range of 0.5 hours or more and 20 hours or less, and more preferably in a range of 1 hour or more and 10 hours or less. By providing the third holding step, the unstable phase is readily decomposed.

The temperature lowering time for lowering the temperature of the resulting annealed product to room temperature is preferably in a range of 0.1 hours or more and 20 hours or less, more preferably in a range of 1 hour or more and 15 hours or less, and still more preferably in a range of 3 hours or more and 12 hours or less. According to this, the unstable phase is readily decomposed during the temperature lowering.

In the annealing treatment step, it is preferred to anneal the heat-treated product together with a compound containing an activating element (the third compound containing an activating element).

So long as the β-sialon fluorescent material having the desired composition is obtained, the third compound containing an activating element may be a compound the same as or different from the first compound containing an activating element which is contained in the raw material mixture, or the second compound containing an activating element which is heat-treated together with the heat-treated product.

It is preferred that the amount of the third compound containing an activating element be smaller than that of the first compound containing an activating element which is contained in the raw material mixture.

As for the third compound containing an activating element, first of all, a part of the third compound containing an activating element is reduced together with the heat-treated product through the annealing treatment in a noble gas atmosphere, thereby producing an activating element elemental substance or a gaseous material containing an ion of the activating element with a valence having an energy level as a center of light emission. Subsequently, this gaseous material comes into contact with the heat-treated product, whereby the activating element contained in the heat-treated product is reduced into the activating element with a valence having an energy level as a center of light emission. Furthermore, it may be considered that the activating element having an energy level as a center of light emission, which is contained in the gaseous material, is also readily incorporated into the annealed product. In this way, the activating element as a center of light emission is efficiently incorporated into the β-sialon fluorescent material, and as a result, the β-sialon fluorescent material with a high light emission intensity can be obtained.

In the case where the activating element is, for example, Eu, first of all, in the annealing treatment step, by annealing a compound containing Eu (for example, $Eu_2O_3$) together with the heat-treated product, trivalent Eu in $Eu_2O_3$ is reduced to produce Eu or a gaseous material containing $Eu^{2+}$. Subsequently, due to Eu in the gaseous material, not only $Eu^{3+}$ contained in the heat-treated product is reduced into $Eu^{2+}$, but also the resulting $Eu^{2+}$ or $Eu^{2+}$ produced in the gaseous material is incorporated into the annealed product, and a β-sialon fluorescent material containing a plenty of $Eu^{2+}$ serving as a center of light emission is readily produced.

The amount of the third compound containing an activating element to be annealed together with the heat-treated product is preferably 0.01 parts by mass or more, more preferably 0.05 parts by mass or more, and still more preferably 0.1 parts by mass or more on the basis of the heat-treated product (100 parts by mass). In addition, the amount of the third compound containing an activating element is preferably 50 parts by mass or less, more preferably 20 parts by mass or less, still more preferably 15 parts by mass or less, and especially preferably 10 parts by mass or less on the basis of the heat-treated product (100 parts by mass).

In the annealing treatment step, it is preferred that the third compound containing an activating element be annealed in such a manner that the gaseous material, from which the third compound containing an activating element is produced, is able to come into contact with the heat-treated product. In this case, the heat-treated product and the third compound containing an activating element may be charged, in a mixed or non-mixed state, in the same vessel, followed by annealing, and may also be charged, in a non-mixed state, in separate vessels, respectively, followed by annealing. In addition, a part of the third compound containing an activating element to be used and the heat-treated product may be charged, in a mixed or non-mixed state, in the same vessel, and the remaining third compound containing an activating element may be charged in a separate vessel, following by annealing. In the case of mixing the heat-treated product and the third compound containing an activating element, it is preferred to mix them uniformly as far as possible.

Classification Step

In the method of producing a β-sialon fluorescent material, after the annealing treatment step, the resulting annealed product is crushed or ground, and thereafter, a classification step of performing classification may be included.

As for crushing or grinding, which is performed before the classification step, the annealed product can be crushed or ground in a desired size by using a dry grinder, for example, a ball mill, a vibration mill, a hammer mill, a roll mill, a jet mill. Alternatively, the annealed product may also be crushed or ground in a desired size by using a mortar and a pestle. The grinding, which is performed after the annealing treatment step but before the classification step, means crushing or grinding of the agglomerate resulting from agglomeration by the annealing treatment and excludes strong grinding to be performed such that the specific surface area of the ground annealed product is 0.2 m²/g or more.

Post-Treatment Step

The method of producing a β-sialon fluorescent material may include a post-treatment step for post-treating the heat-treated product or annealed product. Examples of the post-treatment step include an acid treatment step, a base treatment step, and a fluorine treatment step as mentioned below, and the like.

There is a case where a thermally decomposed product produced in the calcination step or heat treatment step, such as a silicon elemental substance, is contained in the heat-treated product or annealed product. By performing the post-treatment step, the thermally decomposed product, such as a silicon elemental substance, can be removed. Though it may be considered that the silicon elemental substance absorbs a part of the light emission of the β-sialon fluorescent material, by removing such a thermally decomposed product, the light emission intensity of the β-sialon fluorescent material can be more enhanced.

Acid Treatment Step

As for the post-treatment step, it is preferred that the heat-treated product or annealed product be brought into contact with an acidic solution. This post-treatment step is sometimes referred to as an acid treatment step.

As for the acid treatment step, the heat-treated product may be brought into contact with an acidic solution without going through the annealing treatment step, and the annealed product having going through the annealing treatment step may be brought into contact with an acidic solution.

The content of the thermally decomposed product contained in the heat-treated product or annealed product can be decreased by the acid treatment step.

An acidic substance which is contained in the acidic solution may be an inorganic acid, such as hydrofluoric acid and nitric acid, or hydrogen peroxide.

The acidic solution is preferably an acidic solution containing at least one selected from hydrofluoric acid and nitric acid, and more preferably a mixed acid solution containing both hydrofluoric acid and nitric acid. The acidic solution may also contain, in addition to hydrofluoric acid and nitric acid, hydrochloric acid.

Base Treatment Step

It is preferred that the method of producing a β-sialon fluorescent material according to an embodiment of the present disclosure include a post-treatment step of bringing the heat-treated product or annealed product into contact with a basic substance. This post-treatment step is sometimes referred to as a base treatment step.

As for the base treatment step, the heat-treated product may be brought into contact with a basic substance without going through the annealing treatment step, and the annealed product having gone through the annealing treatment step may be brought into contact with a basic substance.

The content of the thermally decomposed product contained in the heat-treated product or annealed product can be decreased by the base treatment step.

The basic substance is preferably at least one selected from the group consisting of LiOH, NaOH, KOH, RbOH, CsOH, and $NH_3$, and more preferably at least one of NaOH and KOH.

Fluorine Treatment Step

The method of producing a β-sialon fluorescent material according to an embodiment of the present disclosure may include a post-treatment step of bringing the heat-treated product or annealed product into contact with a fluorine-containing substance. This post-treatment step is sometimes referred to as a fluorine treatment step. As the fluorine-containing substance which is used in the fluorine treatment step, hydrofluoric acid which is used for the acidic solution in the acid treatment step is excluded.

As for the fluorine treatment step, the heat-treated product may be brought into contact with a fluorine-containing substance without going through the annealing treatment step, and the annealed product having gone through the annealing treatment step may be brought into contact with a fluorine-containing substance.

The content of the thermally decomposed product contained in the heat-treated product or annealed product can be decreased by the fluorine treatment step.

The fluorine-containing substance is preferably at least one selected from the group consisting of $F_2$, $CHF_3$, $CF_4$, $NH_4HF_2$, $NH_4F$, $SiF_4$, $KrF_2$, $XeF_2$, $XeF_4$, and $NF_3$.

The fluorine-containing substance is more preferably a fluorine gas ($F_2$) or aluminum fluoride ($NH_4F$). The fluorine-containing substance is not required to be a gas. For example, though $NH_4HF_2$, $NH_4F$, and the like are a solid, a gas containing a fluorine element is released in the fluorine treatment step, and the content of the thermally decomposed product which is contained in the heat-treated product or annealed product can be decreased by this gas containing a fluorine element.

The atmosphere where the heat-treated product or annealed product is brought into contact with the fluorine-containing substance is preferably an inert gas atmosphere.

By bringing the heat-treated product or annealed product into contact with the fluorine-containing substance in the inert gas atmosphere, the thermally decomposed product which is contained in the heat-treated product or annealed product can be more efficiently removed.

Classification Step, Etc. After Post-Treatment Step

After the heat treatment step, the resulting β-sialon fluorescent material can be subjected to a crushing treatment, a grinding treatment, a classification treatment, and so on.

EXAMPLES

The present disclosure will be more specifically described by way of Examples, but the present disclosure will not be limited to these Examples.

Example 1

Silicon nitride ($Si_3N_4$), aluminum nitride (AlN), aluminum oxide ($Al_2O_3$) and europium oxide ($Eu_2O_3$) were weighed in a molar ratio of Si:Al:Eu of 5.75:0.25:0.01 and mixed to obtain a raw material mixture. At that time, aluminum nitride and aluminum oxide (AlN:$Al_2O_3$) were weighed and mixed so that the molar ratio was 89.5:10.5.

This raw material mixture was charged in a boron nitride-made crucible and calcined in a nitrogen atmosphere (nitrogen: 99% by volume or more) at 0.92 MPa (gauge pressure) and 2,030° C. for 10 hours, thereby obtaining a calcined product.

The resulting calcined product was coarsely ground using a mortar and a pestle and then subjected to a first grinding treatment by means of strong grinding for 20 hours by using a ball mill using two kinds of silicon nitride-made balls having a diameter ($\phi$) of 20 mm and a diameter ($\phi$) of 25 mm, respectively and a ceramic pot, thereby obtaining a ground product. In the first grinding step, 0.0015 mols of europium oxide ($Eu_2O_3$) was added to 1 mol of the calcined product, and the grinding treatment was performed.

Subsequently, the resulting ground product was charged in a boron nitride-made crucible and then subjected to a first heat treatment in a nitrogen atmosphere (nitrogen: 99% by volume or more) at 0.92 MPa (gauge pressure) and 2,000° C. for 10 hours, thereby obtaining a heat-treated product. The resulting heat-treated product was subjected to temperature lowering to room temperature for 5 hours.

Subsequently, the resulting heat-treated product was subjected to a second grinding treatment under the same conditions as those in the first grinding step, thereby obtaining a ground product. In the second grinding step, 0.001 mols of europium oxide ($Eu_2O_3$) was added to 1 mol of the calcined product, and the grinding treatment was performed.

Subsequently, the resulting ground product was subjected to a second heat treatment under the same conditions as those in the first heat treatment step, thereby obtaining a heat-treated product. The resulting heat-treated product was subjected to temperature lowering to room temperature for 5 hours.

Relative to 100 parts by mass of the resulting heat-treated product, 0.5 parts by mass of europium oxide ($Eu_2O_3$) was weighed and added to the heat-treated product, thereby obtaining a mixture.

Subsequently, the resulting mixture was subjected to an annealing treatment in an argon atmosphere at atmospheric pressure (about 0.1 MPa) and 1,400° C. for 5 hours.

In the annealing treatment step, on the way of temperature lowering of the annealed product from the annealing treatment temperature to room temperature, the annealed product was held at 1,100° C. for 5 hours, and after going through this holding step, the annealed product was obtained.

Subsequently, the annealed product was crushed or ground and then dispersed to achieve a classification treatment.

Subsequently, the annealed product having been subjected to the classification treatment was put into a mixed acid solution obtained by mixing hydrofluoric acid (HF: 50% by mass) and nitric acid ($HNO_3$: 60% by mass) in a ratio of 1:1 (mass ratio), and the contents were stirred at 50° C. for 30 minutes, followed by washing and drying to produce a β-sialon fluorescent material.

Example 2

A β-sialon fluorescent material was produced in the same manner as in Example 1, except that the grinding time in the second grinding step was changed to 40 hours.

Example 3

A β-sialon fluorescent material was produced in the same manner as in Example 1, except that the grinding time in the second grinding step was changed to 60 hours.

Example 4

A β-sialon fluorescent material was produced in the same manner as in Example 1, except that the grinding time in the first grinding step was changed to 40 hours, and that the grinding time in the second grinding step was changed to 40 hours.

Example 5

A β-sialon fluorescent material was produced in the same manner as in Example 1, except that the grinding time in the first grinding step was changed to 60 hours.

Example 6

A β-sialon fluorescent material was produced in the same manner as in Example 1, except that the second grinding step and the second heat treatment step were not performed.

Comparative Example 1

A β-sialon fluorescent material was produced in the same manner as in Example 1, except that in the first grinding step and the second grinding step, a ball mill in which the ceramic pot was replaced by a polypropylene-made vessel was used, and that the grinding time was changed to 0.5 hours.

Evaluation

Surface Area

In each of the Examples and Comparative Example, with respect to the ground product obtained in the first grinding step, the ground product obtained in the second grinding step, and the β-sialon fluorescent material, a specific surface area was measured with an automatic specific surface area measurement apparatus (GEMINI 2375, manufactured by Micromeritics) by the BET method.

Average Particle Diameter

In the Examples and Comparative Example, with respect to each of the ground products obtained in the first grinding step, the ground products obtained in the second grinding step, and the β-sialon fluorescent materials, an average particle diameter (Dm: median diameter) at which the volume cumulative frequency reaches 50% from the small diameter side, a particle diameter (D10) at which the volume cumulative frequency reaches 10% from the small diameter side, and a particle diameter (D90) at which the volume cumulative frequency reaches 90% from the small diameter side were measured with a laser diffraction particle size distribution measuring apparatus (product name: MASTER SIZER 3000, manufactured by Malvern Instruments, Ltd.). In addition, a standard deviation (σ) was calculated from the particle size distribution of the measured β-sialon fluorescent material. The results are shown in Table 1.

Light Emission Characteristics

With respect to the β-sialon fluorescent material of each of the Examples and Comparative Example, the light emission characteristics were measured. The light emission characteristics of the β-sialon fluorescent material were measured with a spectrofluorophotometer (QE-2000, manufactured by Otsuka Electronics Co., Ltd.) at a wavelength of excitation light of 450 nm. The energy of the resulting light emission spectrum (relative light emission intensity, %) was obtained. The results are shown in the following Table 1. The relative light emission intensity was calculated based on the β-sialon fluorescent material of Comparative Example 1 as 100%. In addition, FIG. 1 shows the light emission spectrum (the relation between the wavelength (nm) and the relative light emission intensity (%)) of each of Example 1 and Comparative Example 1.

SEM Image

SEM images of the β-sialon fluorescent materials of Example 1 and Comparative Example 1 were obtained with a scanning electron microscope (SEM).

Figure 2A:
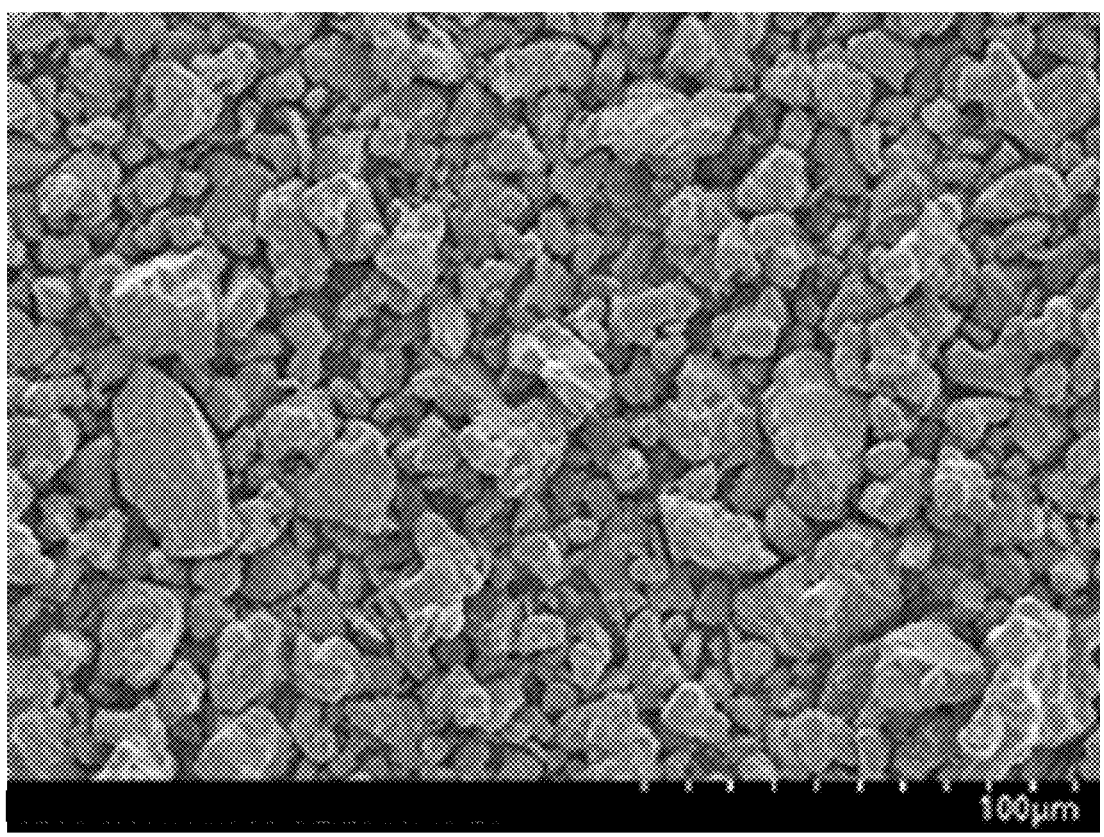
FIG. 2A is an SEM photograph of a ground product after a first grinding step in the example of the present disclosure.
Figure 2B:
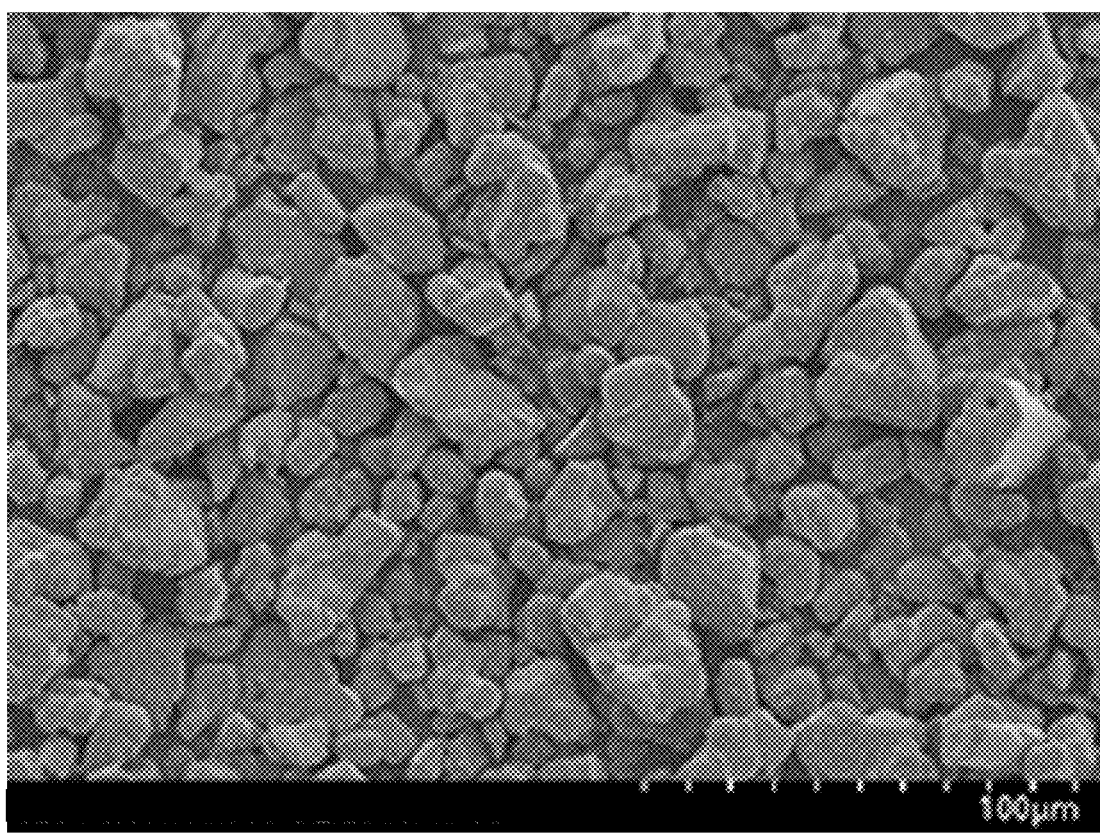
FIG. 2B is an SEM photograph of a ground product after a second grinding step in the example of the present disclosure.
Figure 2C:
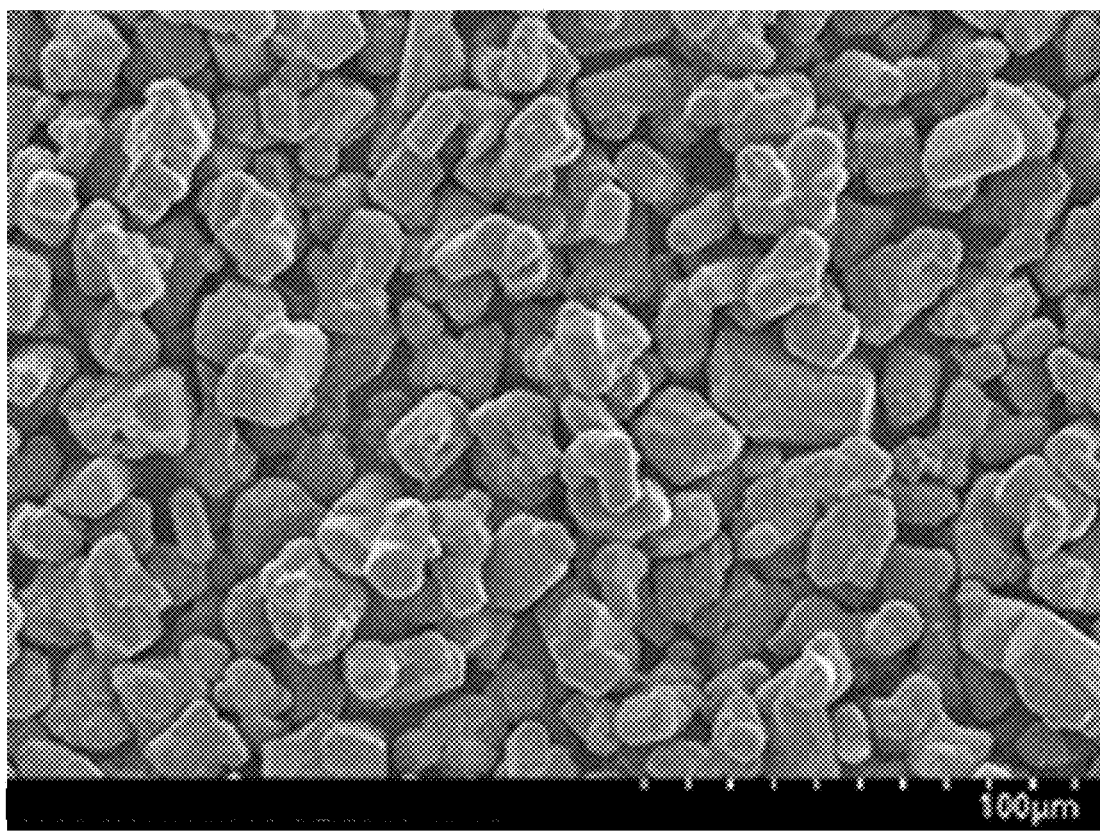
FIG. 2C is an SEM photograph of a β-sialon fluorescent material after an annealing step and a post-treatment step in the example of the present disclosure.

FIG. 2A is an SEM photograph of the ground product after the first grinding step in Example 1, FIG. 2B is an SEM photograph of the ground product after the second grinding step in Example 1, and FIG. 2C is an SEM photograph of the β-sialon fluorescent material after the annealing step and the post-treatment step in Example 1.

Figure 3A:
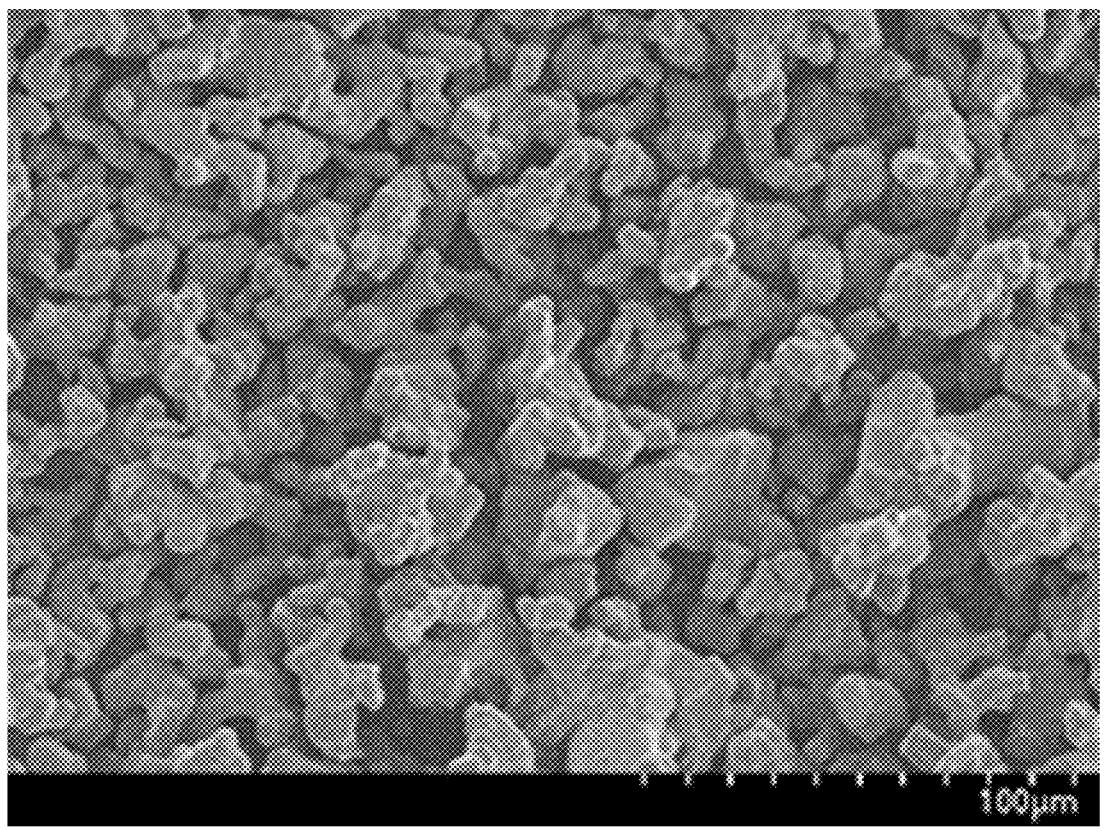
FIG. 3A is an SEM photograph of a ground product after a first grinding step in the comparative example.
Figure 3B:
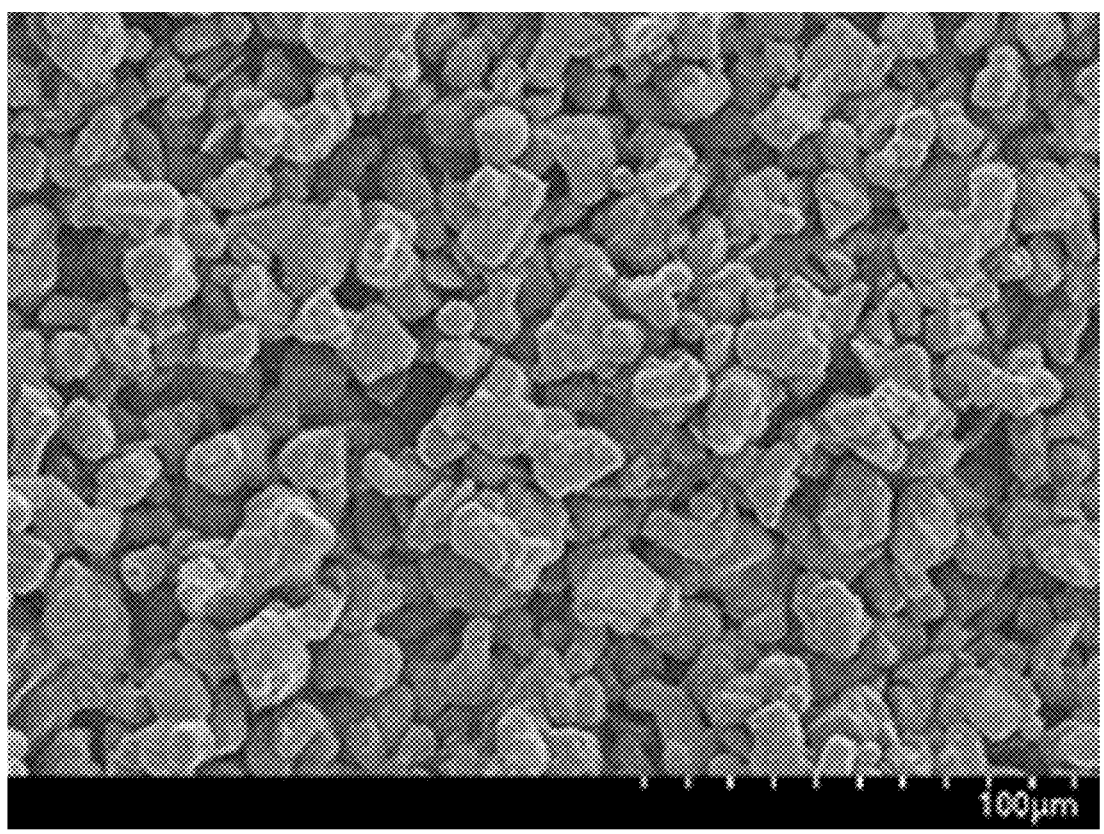
FIG. 3B is an SEM photograph of a ground product after a second grinding step in the comparative example.
Figure 3C:
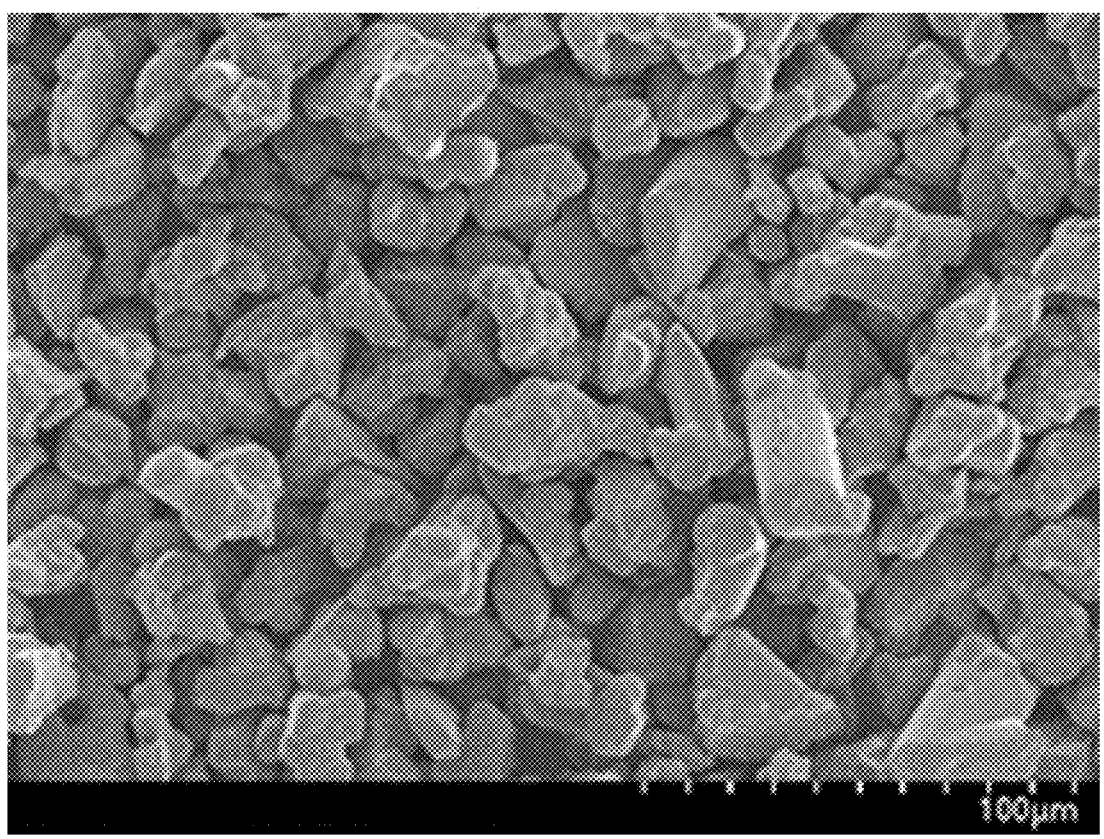
FIG. 3C is an SEM photograph of a β-sialon fluorescent material after an annealing step and a post-treatment step in the comparative example.

FIG. 3A is an SEM photograph of the ground product after the first grinding step in Comparative Example 1, FIG. 3B is an SEM photograph of the ground product after the second grinding step in Comparative Example 1, and FIG. 3C is an SEM photograph of the β-sialon fluorescent material after the annealing step and the post-treatment step in Comparative Example 1.

As shown in Table 1, the β-sialon fluorescent materials of Examples 1 to 6 in which in the first or second grinding step, the calcined product or heat-treated product was strongly ground so as to have a specific surface area of 0.2 $m^2/g$ or more, followed by achieving the heat treatment step exhibited a higher light emission intensity than the β-sialon fluorescent material of Comparative Example 1 in which the strong grinding was not performed.

As shown in Table 1, in Examples 1 to 5, the β-sialon fluorescent materials are obtained by repeating the grinding step and the heat treatment step two times in this step order. The thus obtained β-sialon fluorescent materials of Examples 1 to 5 exhibited a higher relative light emission intensity than the β-sialon fluorescent material of Example 6 in which the grinding step and the heat treatment step were performed only one time in this step order.

In particular, as shown in Table 1, in Examples 2 to 5, the grinding step and the heat treatment step are repeated in this order two times, and in at least one grinding step, the strong grinding is performed such that the specific surface area of the ground product is 0.35 $m^2/g$ or more. The thus obtained β-sialon fluorescent materials of Examples 2 to 5 exhibited higher light emission intensities than those of Examples 1 and 6. Furthermore, as shown in Table 1, in Examples 4 and 5, in at least one grinding step, the strong grinding is performed such that the specific surface area of the ground product is 0.37 $m^2/g$ or more. The thus obtained β-sialon fluorescent materials of Examples 4 and 5 exhibited still higher light emission intensities than those of the other Examples.

In addition, as shown in FIG. 1, the light emission spectrum of the fluorescent material of Example 1 and the light emission spectrum of the fluorescent material of Comparative Example 1 are substantially the same as each other in the light emission peak wavelength and the shape of the light emission spectrum; however, the fluorescent material of Example 1 is higher in the light emission peak than the fluorescent material of Comparative Example 1, and thus, it is noted that the light emission intensity of the fluorescent material of Example 1 becomes high.

As shown in Table 1, the ground products, which were strongly ground in the first grinding step and the second grinding step so as to have a specific surface area of 0.20 $m^2/g$ or more, contain relatively large particles together with small particles as shown in the SEM photographs of FIG. 2A and FIG. 2B. In the β-sialon fluorescent material of Example 1, in the heat treatment step after the grinding step, the reaction between the small particle and the large particle is more advanced to cause the rearrangement of crystal, and

TABLE 1

| | First ground product | | | | | Second ground product | | | | | β-Sialon fluorescent material | | | | Relative |
| | | | | | | | | | | | | Particle diameter (μm) | | | light |
| | Grinding | Particle diameter (μm) | | | Specific surface area | Grinding | Particle diameter (μm) | | | Specific surface area | | σ (Standard | | | emission intensity |
| | (hr) | Dm | D10 | D90 | ($m^2/g$) | (hr) | Dm | D10 | D90 | ($m^2/g$) | Dm | deviation) | D10 | D90 | (%) |
|---|---|---|---|---|---|---|---|---|---|---|---|---|---|---|---|
| Example 1 | 20 | 19.7 | 9.3 | 35.5 | 0.311 | 20 | 18.9 | 10.4 | 32.2 | 0.294 | 25.8 | 0.335 | 16.9 | 39.3 | 103.9 |
| Example 2 | 20 | 19.2 | 9.0 | 34.2 | 0.355 | 40 | 16.9 | 8.9 | 28.5 | 0.394 | 25.8 | 0.329 | 16.9 | 38.7 | 105.9 |
| Example 3 | 20 | 19.7 | 9.2 | 35.5 | 0.305 | 60 | 11.3 | 4.1 | 20.1 | 0.862 | 25.2 | 0.347 | 16.2 | 39.0 | 106.6 |
| Example 4 | 40 | 16.5 | 7.7 | 29.5 | 0.388 | 40 | 16.3 | 8.4 | 28.5 | 0.370 | 26.3 | 0.356 | 16.8 | 40.9 | 107.1 |
| Example 5 | 60 | 12.1 | 4.5 | 23.5 | 0.761 | 20 | 16.6 | 9.5 | 26.5 | 0.353 | 26.9 | 0.361 | 17.1 | 42.2 | 106.9 |
| Example 6 | 20 | 19.7 | 9.3 | 35.5 | 0.311 | — | — | — | — | — | 27.6 | 0.337 | 18.0 | 42.0 | 102.2 |
| Comparative Example 1 | 0.5 | 55.1 | 15.9 | 198.0 | 0.181 | 0.5 | 58.1 | 22.1 | 177.0 | 0.109 | 26.6 | 0.338 | 17.4 | 40.4 | 100.0 | not only the activating element is readily incorporated into the rearranged crystal, but also the heat-treated product can be grown to a desired size. Thus, it is estimated that the light emission intensity is enhanced.

On the other hand, as shown in the SEM photographs of FIG. 3A, FIG. 3B and FIG. 3C in Comparative Example 1 in which the strong grinding was not performed in the first grinding step and the second grinding step, the presence of agglomerates was confirmed, and the amount of small particles was small as compared with the ground products of Example 1 as shown in the SEM photographs of FIG. 2A, FIG. 2B and FIG. 2C.

As shown in Comparative Example 1 of Table 1, in the case where the strong grinding of the calcined product or heat-treated product was not performed, and the crushing or coarse grinding was performed in the first grinding step and the second grinding step such that the specific surface area was smaller than 0.20 m²/g, the improvement in the light emission intensity as in the Examples could not be confirmed.

As shown in Table 1, the particle diameter D10 at which the volume cumulative frequency reaches 10% from the small diameter side in the particle size distribution was 3 µm or more and 10.5 µm or less with respect to the first ground product or the second ground product in each of the Examples. On the other hand, as shown in Table 1, the D10 of Comparative Example 1 was larger than 12 µm with respect to the first ground product and the second ground product.

As shown in Table 1, the particle diameter D90 at which the volume cumulative frequency reaches 90% from the small diameter side in the particle size distribution was 20 µm or more and 40 µm or less with respect to the first ground product or the second ground product in each of the Examples. On the other hand, as shown in Table 1, the D90 of Comparative Example 1 was at least 3 times larger than 50 µm with respect to the first ground product and the second ground product.

The standard deviation (a) in the particle size distribution of the β-sialon fluorescent material was 0.4 or less in each of the Examples, and a β-sialon fluorescent material having a uniform particle diameter was obtained.

The β-sialon fluorescent material produced by the methods as disclosed herein is high in the light emission intensity, and by using this β-sialon fluorescent material, a light emitting device having a high light emission intensity can be configured.

Although the present disclosure has been described with reference to several exemplary embodiments, it shall be understood that the words that have been used are words of description and illustration, rather than words of limitation. Changes may be made within the purview of the appended claims, as presently stated and as amended, without departing from the scope and spirit of the disclosure in its aspects. Although the disclosure has been described with reference to particular examples, means, and embodiments, the disclosure may be not intended to be limited to the particulars disclosed; rather the disclosure extends to all functionally equivalent structures, methods, and uses such as are within the scope of the appended claims.

One or more examples or embodiments of the disclosure may be referred to herein, individually and/or collectively, by the term "disclosure" merely for convenience and without intending to voluntarily limit the scope of this application to any particular disclosure or inventive concept. Moreover, although specific examples and embodiments have been illustrated and described herein, it should be appreciated that any subsequent arrangement designed to achieve the same or similar purpose may be substituted for the specific examples or embodiments shown. This disclosure may be intended to cover any and all subsequent adaptations or variations of various examples and embodiments. Combinations of the above examples and embodiments, and other examples and embodiments not specifically described herein, will be apparent to those of skill in the art upon reviewing the description.

In addition, in the foregoing Detailed Description, various features may be grouped together or described in a single embodiment for the purpose of streamlining the disclosure. This disclosure may be not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter shall be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure may be determined by the broadest permissible interpretation of the following claims and their equivalents, and shall not be restricted or limited by the foregoing detailed description.

What is claimed is:

1. A method of producing a β-sialon fluorescent material, comprising:
   preparing a calcined product having a composition of β-sialon containing an activating element by calcining a raw material mixture containing a first compound containing an activating element;
   grinding the calcined product together with a second compound containing an activating element in the absence of another raw material for making β-sialon to obtain a ground product, wherein the ground product does not contain a raw material for making β-sialon other than the second compound containing the activating element; and
   heat-treating the ground product to obtain a heat-treated product, wherein
      a specific surface area of the ground product is 0.25 m²/g or more,
   wherein the first compound containing the activating element and the second compound containing the activating element do not have a composition of a β-sialon containing an activating element, and
   a molar ratio of the activating element contained in the second compound containing the activating element is smaller than a ratio of the activating element in the first compound containing the activating element in the raw material.

2. The method of producing a β-sialon fluorescent material according to claim 1, wherein a particle diameter D10, at which a volume cumulative frequency reaches 10% from a small diameter side in a particle size distribution, of the ground product is 1 µm or more and 12 µm or less.

3. The method of producing a β-sialon fluorescent material according to claim 1, wherein a particle diameter D90, at which a volume cumulative frequency reaches 90% from a small diameter side in a particle size distribution, of the ground product is 15 µm or more and 50 µm or less.

4. The method of producing a β-sialon fluorescent material according to claim 1, wherein the heat-treating is performed in an inert gas atmosphere.

5. The method of producing a β-sialon fluorescent material according to claim 1, wherein the activating element is at least one element selected from the group consisting of Eu, Ce, Tb, Yb, Sm, and Dy,
the first compound containing the activating element and the second compound containing the activating element are at least one selected from the group consisting of an oxide, a hydroxide, a nitride, an oxynitride, a fluoride and a chloride, and
when a molar ratio of the activating element contained in the resulting β-sialon fluorescent material is defined as 1, a molar ratio of the activating element in the first compound containing the activating element is 0.55 or more, a molar ratio of the activating element in the second compound containing the activating element is 0.45 or less.

6. The method of producing a β-sialon fluorescent material according to claim 1, further comprising annealing the heat-treated product in a noble gas atmosphere at a temperature lower than a heat treatment temperature in the heat-treating step, to obtain an annealed product.

7. The method of producing a β-sialon fluorescent material according to claim 6, wherein in the annealing step, the heat-treated product is annealed together with a compound containing an activating element.

8. The method of producing a β-sialon fluorescent material according to claim 6, further comprising bringing the heat-treated product or the annealed product into contact with an acidic solution or a basic substance, wherein
the basic substance is at least one selected from the group consisting of LiOH, NaOH, KOH, RbOH, CsOH and $NH_3$.

9. The method of producing a β-sialon fluorescent material according to claim 1, wherein the calcined product has a composition represented by a formula: $Si_{6-z}Al_zO_zN_{8-z}$:Eu, wherein z is a number satisfying $0<z\leq4.2$.

10. A method of producing a β-sialon fluorescent material, comprising:
preparing a calcined product having a composition of β-sialon containing an activating element by calcining a raw material mixture containing a first compound containing an activating element;
grinding the calcined product together with a second compound containing an activating element in the absence of a raw material for making β-sialon other than the second compound containing the activating element to obtain a ground product, wherein the ground product does not contain a raw material for making β-sialon other than the second compound containing the activating element; and
heat-treating the ground product to obtain a heat-treated product, wherein
the grinding and heat-treating steps are repeated two times or more in this order, and
in at least one grinding step, an average particle diameter of the ground product is 40 μm or less, and a specific surface area of the ground product is 0.25 $m^2/g$ or more,
wherein the first compound containing the activating element and the second compound containing the activating element do not have a composition of a β-sialon containing an activating element, and
a molar ratio of the activating element contained in the second compound containing the activating element is smaller than a ratio of the activating element in the first compound containing the activating element in the raw material.

11. The method of producing a β-sialon fluorescent material according to claim 10, wherein a particle diameter D10, at which a volume cumulative frequency reaches 10% from a small diameter side in a particle size distribution, of the ground product is 1 μm or more and 12 μm or less.

12. The method of producing a β-sialon fluorescent material according to claim 10, wherein a particle diameter D90, at which a volume cumulative frequency reaches 90% from a small diameter side in a particle size distribution, of the ground product is 15 μm or more and 50 μm or less.

13. The method of producing a β-sialon fluorescent material according to claim 10, wherein the heat-treating is performed in an inert gas atmosphere.

14. The method of producing a β-sialon fluorescent material according to claim 10, wherein the activating element is at least one element selected from the group consisting of Eu, Ce, Tb, Yb, Sm, and Dy,
the first compound containing the activating element and the second compound containing the activating element are at least one selected from the group consisting of an oxide, a hydroxide, a nitride, an oxynitride, a fluoride and a chloride, and
when a molar ratio of the activating element contained in the resulting β-sialon fluorescent material is defined as 1, a molar ratio of the activating element in the first compound containing the activating element is 0.55 or more, a molar ratio of the activating element in the second compound containing the activating element is 0.45 or less.

15. The method of producing a β-sialon fluorescent material according to claim 10, further comprising annealing the heat-treated product in a noble gas atmosphere at a temperature lower than a heat treatment temperature in the heat-treating step, to obtain an annealed product.

16. The method of producing a β-sialon fluorescent material according to claim 15, further comprising bringing the heat-treated product or the annealed product into contact with an acidic solution or a basic substance, wherein the basic substance is at least one selected from the group consisting of LiOH, NaOH, KOH, RbOH, CsOH and $NH_3$.

17. The method of producing a β-sialon fluorescent material according to claim 10, wherein the calcined product has a composition represented by a formula: $Si_{6-z}Al_zO_zN_{8-z}$:Eu, wherein z is a number satisfying $0<z\leq4.2$.

18. The method of producing a β-sialon fluorescent material according to claim 1, wherein a particle diameter D10, at which a volume cumulative frequency reaches 10% from a small diameter side in a particle size distribution, of the β-sialon fluorescent material is 16.2 μm or more.

19. The method of producing a β-sialon fluorescent material according to claim 10, wherein a particle diameter D10, at which a volume cumulative frequency reaches 10% from a small diameter side in a particle size distribution, of the β-sialon fluorescent material is 16.2 μm or more.

20. The method of producing a β-sialon fluorescent material according to claim 10, wherein the compound containing the activating element is at least one selected from the group consisting of an oxide, a hydroxide, a nitride, an oxynitride, a fluoride and a chloride.

* * * * *